United States Patent
Cheng

(10) Patent No.: US 11,340,490 B2
(45) Date of Patent: May 24, 2022

(54) DISPLAY DEVICE AND BACKLIGHT MODULE THEREOF

(71) Applicants: HKC Corporation Limited, Shenzhen (CN); Chongqing HKC Optoelectronics Technology Co., ltd., Chongqing (CN)

(72) Inventor: Jiahe Cheng, Chongqing (CN)

(73) Assignees: HKC CORPORATION LIMITED, Shenzhen (CN); CHONGOING HKC OPTOELECTRONICS TECHNOLOGY CO., LTD., Chongqing (CN)

(*) Notice: Subject to any disclaimer, the term of this patent is extended or adjusted under 35 U.S.C. 154(b) by 23 days.

(21) Appl. No.: 16/954,730

(22) PCT Filed: Sep. 11, 2018

(86) PCT No.: PCT/CN2018/105069
§ 371 (c)(1),
(2) Date: Jun. 17, 2020

(87) PCT Pub. No.: WO2019/119891
PCT Pub. Date: Jun. 27, 2019

(65) Prior Publication Data
US 2021/0096420 A1 Apr. 1, 2021

(30) Foreign Application Priority Data
Dec. 21, 2017 (CN) .......................... 201711392508.0

(51) Int. Cl.
*G02F 1/1335* (2006.01)
*G02F 1/13357* (2006.01)

(52) U.S. Cl.
CPC .. *G02F 1/133524* (2013.01); *G02F 1/133603* (2013.01); *G02F 1/133605* (2013.01)

(58) Field of Classification Search
CPC ......... G02F 1/133524; G02F 1/133603; G02F 1/133605; G02F 1/133553;
(Continued)

(56) References Cited

U.S. PATENT DOCUMENTS

2009/0135627 A1* 5/2009 Furuyama ............ G02B 6/0055
362/621

FOREIGN PATENT DOCUMENTS

| CN | 101424376 A | 5/2009 |
| CN | 103175033 A | 6/2013 |
| CN | 103939799 A | 7/2014 |

OTHER PUBLICATIONS

Machine translation of CN-103175033-A.*

* cited by examiner

*Primary Examiner* — Joseph L Williams
*Assistant Examiner* — Jose M Diaz
(74) *Attorney, Agent, or Firm* — WPAT, PC

(57) ABSTRACT

The present application discloses a backlight module and a display device thereof. The backlight module includes a light guide plate, a side part thereof including a light incident surface; a light bar, including a circuit board and a plurality of photoelectric elements disposed on the circuit board, wherein the circuit board includes spacing parts located between two adjacent photoelectric elements, and light emitting surfaces of the photoelectric elements correspond to the light incident surface; and a reflective sheet, disposed between the light guide plate and the light bar, wherein the reflective sheet includes hollowed parts, and the hollowed parts are correspondingly disposed between the light emitting surfaces and the light incident surface, so as to reduce a reflective brightness of the photoelectric elements.

20 Claims, 5 Drawing Sheets

(58) Field of Classification Search
CPC ............ G02F 1/133615; G02B 6/0068; G02B 6/0031; G02B 6/0073
See application file for complete search history.

DISPLAY DEVICE AND BACKLIGHT MODULE THEREOF

FIELD OF THE DISCLOSURE

The present application relates to the technical field of liquid crystal display, in particular to a backlight module and a display device.

BACKGROUND

At present, liquid crystal display (LCD) devices have the characteristics of low power consumption, low radiation, small size, soft pictures, and the like, and are widely applied to televisions, mobile phones and display screens of public information.

Wherein in the exemplary liquid crystal display device, the light-emitting quality of a backlight module will directly affect a picture quality of the display device. Generally, the backlight module includes a light guide plate and LED lights corresponding to a light incident surface of the light guide plate.

In order to reduce the cost of a product, the number of the LED lights in a backlight source should be reduced as much as possible. However, the brightness of a display area of an identical area needs to be ensured while the number of the LED lights is reduced, thus the distances between the LED lights need to be increased. Since light-emitting angles of the LED lights are fixed, if the intervals between the LED lights are increased, it is easy to cause the light-emitting area between two LED lights not to totally cover the light incident surface of the light guide plate and thus form a dark area, thereby affecting the quality of the product.

SUMMARY

In order to solve the problems above, an embodiment of the present application provides a backlight module. The backlight module includes a light guide plate, including a light incident surface in a side part thereof; a light bar, including a circuit board and a plurality of photoelectric elements disposed on the circuit board, wherein the circuit board includes spacing parts located between two adjacent photoelectric elements, and light emitting surfaces of the photoelectric elements correspond to the light incident surface; a reflective sheet, disposed between the light guide plate and the light bar, wherein the reflective sheet includes hollowed parts, and the hollowed parts are correspondingly disposed between the light emitting surfaces and the light incident surface; a plurality of the hollowed parts are disposed, the plurality of hollowed parts and the plurality of photoelectric elements are respectively formed on one side of the reflective sheet adjacent to the light bar correspondingly at intervals, the reflective sheet further includes protruded parts formed between two adjacent hollowed parts, and the protruded parts extend to a direction of the light bar, such that one side of the reflective sheet adjacent to the light bar is sawtooth-shaped; and a back cover, wherein the back cover is disposed on the bottom of the reflective sheet, such that the reflective sheet is located between the back cover and the light guide plate.

The present application also provides a backlight module. The backlight module includes a light guide plate, including a light incident surface in a side part thereof; a light bar, including a circuit board and a plurality of photoelectric elements disposed on the circuit board, wherein the circuit board includes spacing parts located between two adjacent photoelectric elements, and light emitting surfaces of the photoelectric elements correspond to the light incident surface; and a reflective sheet, disposed between the light guide plate and the light bar, wherein the reflective sheet includes hollowed parts, and the hollowed parts are correspondingly disposed between the light emitting surfaces and the light incident surface.

In one embodiment, a plurality of the hollowed parts are disposed, the plurality of hollowed parts and the plurality of photoelectric elements are respectively formed on one side of the reflective sheet adjacent to the light bar correspondingly at intervals, the reflective sheet further includes protruded parts formed between two adjacent hollowed parts, and the protruded parts extend to a direction of the light bar, such that one side of the reflective sheet adjacent to the light bar is sawtooth-shaped.

In one embodiment, the hollowed parts extend to be below the photoelectric elements.

In one embodiment, cutting widths of the hollowed parts are not greater than widths of the light emitting surfaces of the photoelectric elements.

In one embodiment, patterns of the hollowed parts are rectangular.

In one embodiment, the hollowed parts are gradually narrowed toward a direction of the light incident surface.

In one embodiment, the patterns of the hollowed parts are trapezoid or triangular or semicircular or semioval.

In one embodiment, the hollowed parts extend to be below the photoelectric elements.

In one embodiment, cutting widths of the hollowed parts are not greater than widths of the light emitting surfaces of the photoelectric elements.

In one embodiment, the backlight module further includes a back cover, wherein the back cover is disposed on the bottom of the reflective sheet, such that the reflective sheet is located between the back cover and the light guide plate.

The present application also provides a display device. The display device includes an array substrate and a color light filter substrate disposed oppositely, and a liquid crystal layer disposed between the array substrate and the color light filter substrate; wherein the display device further includes a backlight module, correspondingly disposed on the bottom of the array substrate. The backlight module includes a light guide plate, including a light incident surface in a side part thereof; a light bar, including a circuit board and a plurality of photoelectric elements disposed on the circuit board, wherein the circuit board includes spacing parts located between two adjacent photoelectric elements, and light emitting surfaces of the photoelectric elements correspond to the light incident surface; and a reflective sheet, disposed between the light guide plate and the light bar, wherein the reflective sheet includes hollowed parts, and the hollowed parts are correspondingly disposed between the light emitting surfaces and the light incident surface.

In one embodiment, a plurality of the hollowed parts are disposed, the plurality of hollowed parts and the plurality of photoelectric elements are formed on one side of the reflective sheet adjacent to the light bar correspondingly at intervals, the reflective sheet further includes protruded parts formed between two adjacent hollowed parts, and the protruded parts extend to a direction of the light bar, such that one side of the reflective sheet adjacent to the light bar is sawtooth-shaped.

In one embodiment, the hollowed parts extend to be below the photoelectric elements.

In one embodiment, cutting widths of the hollowed parts are not greater than widths of the light emitting surfaces of the photoelectric elements.

In one embodiment, patterns of the hollowed parts are rectangular.

In one embodiment, the hollowed parts are gradually narrowed toward a direction of the light incident surface.

In one embodiment, the patterns of the hollowed parts are trapezoid or triangular or semicircular or semioval.

In one embodiment, the display device further includes a back cover, wherein the back cover is disposed on the bottom of the reflective sheet, such that the reflective sheet is located between the back cover and the light guide plate.

According to the present application, the hollowed parts corresponding to the photoelectric elements are formed in the reflective sheet, to reduce the reflective brightness of the photoelectric elements, such that the brightness of incident light of the light guide plate tends to be consistent. According to the present application, on the basis that the number of the photoelectric elements of the backlight module is reduced, the light guide plate is kept to still have incident light with a uniform brightness, a percent of pass of the product is improved, and the cost is reduced.

BRIEF DESCRIPTION OF THE DRAWINGS

FIG. 2b is a structural schematic view of a backlight module in the display device as shown in FIG. 2a.

DETAILED DESCRIPTION OF PREFERRED EMBODIMENTS

Hereinafter, the present application is introduced in detail in combination with specific embodiments.

Figure 1A:
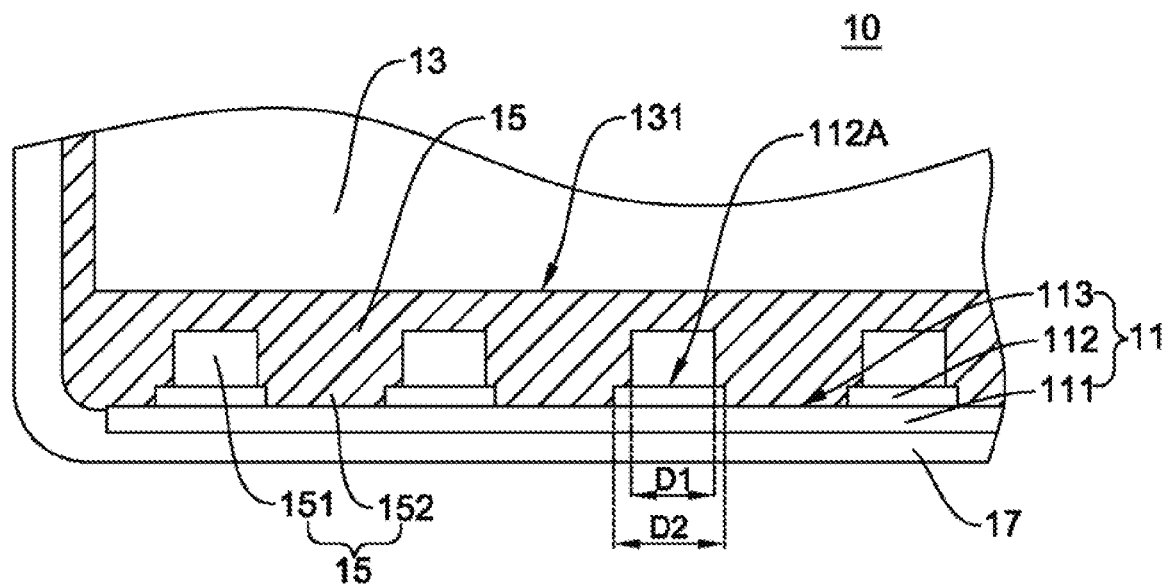
FIG. 1a is a structural schematic view of a backlight module according to an embodiment of the present application.

The embodiment of the present application provides a backlight module. As shown in FIG. 1a, the backlight module 10 includes a back cover 17 and a light guide plate 13 and a reflective sheet 15 which are laminated on the back cover 17 up and down, such that the reflective sheet 15 is located between the light guide plate 13 and the back cover 17. At least one light bar 11 is disposed on the reflective sheet 15 and corresponding to a side part of the light guide plate 13.

The side part of the light guide plate 13 includes a light incident surface 131, used for receiving light emitted by the light bar 11.

The light bar 11 includes a circuit board 111 and a plurality of photoelectric elements 112, wherein the photoelectric elements 112 may be for example LED lights. The plurality of photoelectric elements 112 are sequentially arranged at intervals and are connected on the circuit board 111. The circuit board 111 includes spacing parts 113 located between two adjacent photoelectric elements 112. Light emitting surfaces 112A of the photoelectric elements 112 correspond to the light incident surface 131 of the light guide plate 13.

Further, the reflective sheet 15 of the present embodiment is disposed between the light guide plate 13 and the light bar 11. The reflective sheet 15 includes hollowed parts 151 disposed corresponding to the light bar 11, and protruded parts 152 sandwiched between two adjacent hollowed parts 151.

In an exemplary art, the photoelectric elements in the light bar are arrayed in a relative dense manner, a light-emitting angle of each photoelectric element is about 110°-140°, and a light-emitting area is also correspondingly in an area corresponding to such included angle. The purpose of dense arrangement of the photoelectric elements is to enable the light-emitting areas of two adjacent photoelectric elements to be coincided and then to enter the light incident surface of the light guide plate, such that relatively uniform incident light can be obtained. However, in actual product assembling, in consideration of the cost, it is difficult to densely arrange the photoelectric elements on the light bar, as a result, the distance between the two photoelectric elements is increased, and it is in all probability that the light-emitting areas of the two adjacent photoelectric elements are not coincided till entering the light incident surface. Since the brightness of the light-emitting areas of the photoelectric elements is high, under the assistance of the reflective sheet, the brightness enters the light guide plate with almost no loss. Secondly, the brightness of non-light-emitting areas is low, if there is no supplementation from other reflective ways, part of the light guide plate in the non-light-emitting areas presents an obvious dark area.

Therefore, in the present embodiment, the light incident brightness can be uniformized by structural improvement on the reflective sheet 15.

Wherein the hollowed parts 151 are correspondingly disposed between the light emitting surfaces 112A and the light incident surface 131, to reduce the reflective brightness of the photoelectric elements 112. Optionally, the areas with the strongest brightness between the light emitting surfaces 112A and the light incident surface 131 are concentrated in the light emitting surface 112A of each photoelectric element 112 and the areas nearby, while the light-emitting angle of each photoelectric element 112 is about 110°-140°, such that optionally, the hollowed parts 151 further extend to a direction of the light bar 11 till corresponding to the lower sides of the photoelectric elements 112, and the hollowed parts 151 are caused to correspond to the light emitting surfaces 112A and the areas nearby, so as to achieve the purpose of reducing the reflective brightness of the photoelectric elements 112.

Further, in order to ensure or enhance the reflective brightness of other areas while the reflective brightness of the light emitting surfaces is reduced, for example, the brightness of emergent light on both sides of the photoelectric elements 112 is less than the central brightness of the photoelectric elements 112A. In order to ensure that the emergent light on both sides of the photoelectric elements 112 keeps sufficient reflective brightness, optionally, cutting widths D1 of the hollowed parts 151 are enabled to be not greater than widths D2 of the light emitting surfaces 112A of the photoelectric elements 112, as shown in FIG. 1a.

In addition, in order to further supplement or enhance the reflective brightness of other areas, the protruded parts 152 extend to a direction of the light bar 11 and are connected to the spacing parts 113, such that the light emergent from the both sides of the photoelectric elements 112 can also be incident to the light incident surface 131 after being reflected by the protruded parts 152 of the reflective sheet 15. In this way, the central brightness of the light emitting surfaces of the photoelectric elements 112 is reduced, and the reflective brightness of the peripheries of the photoelectric elements 112 is further enhanced. Under the solution of "one reduction and one enhancement", it can be ensured that the light entering the light guide plate 13 is uniform in brightness, existence of a bright area or the dark area is avoided, and the quality of the backlight module is improved.

Figure 1B:
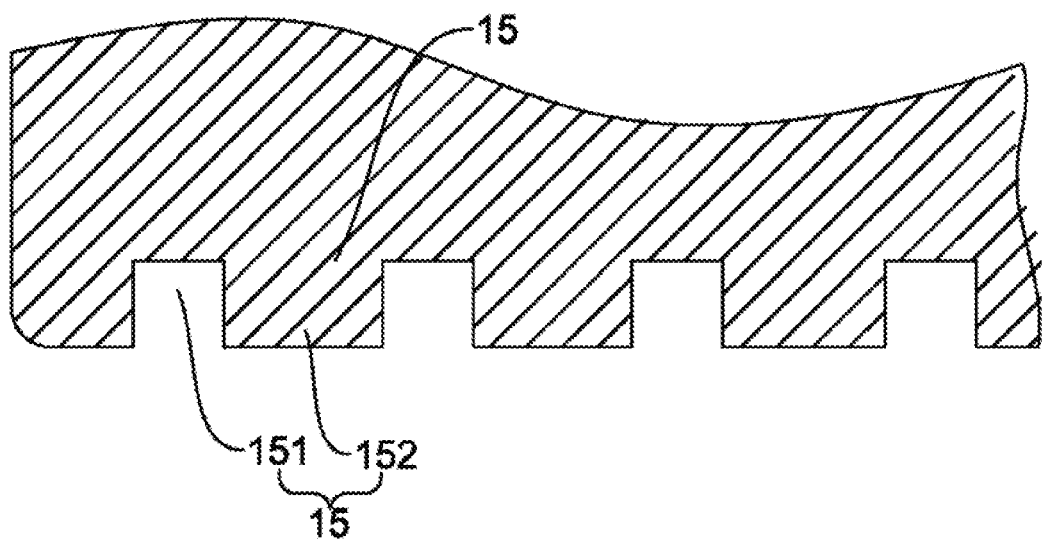
FIG. 1b is a structural schematic view of a reflective sheet in a backlight module according to an embodiment of the present application.

As mentioned above, there are many choices for patterns of the hollowed parts 151. For example, as shown in FIG. 1a, the patterns of the hollowed parts 151 are rectangular, in order for the convenience in a manufacturing process, one side of the reflective sheet 15 corresponding to the light bar 11 may be cut to form the hollowed parts 151 and the protruded parts 152 according to specific patterns. The widths of the cut hollowed parts 151 and the distances between the hollowed parts 151 are determined according to actual light bar parameters, and one side of the cut reflective sheet 15 is sawtooth-shaped, as shown in FIG. 1b.

Figure 1C:
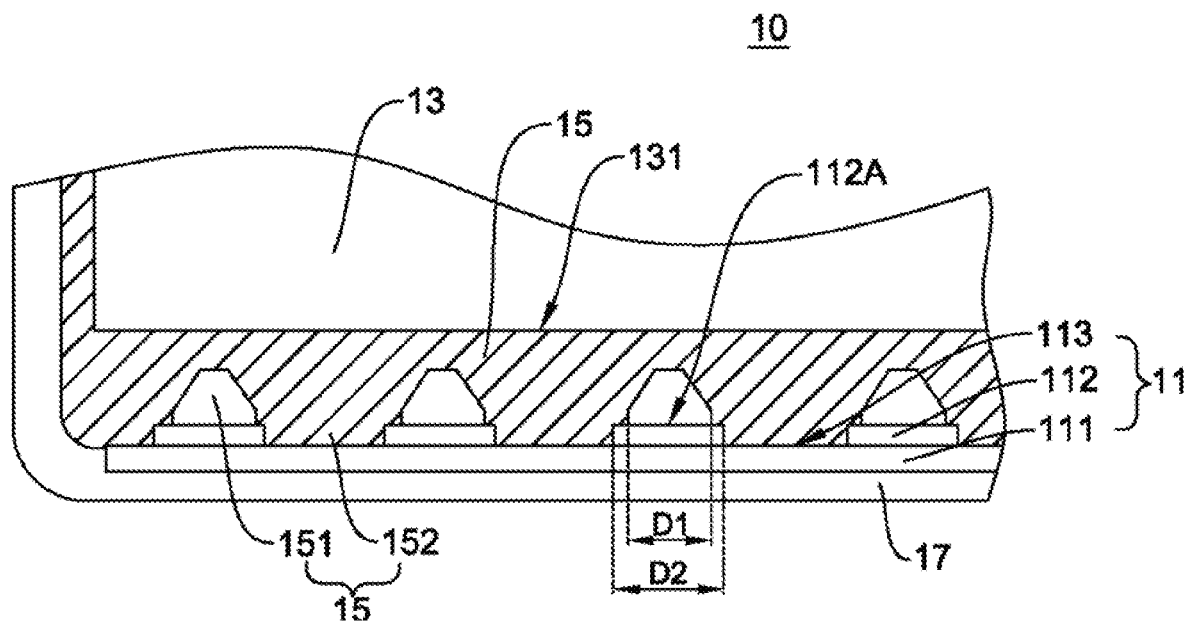
FIG. 1c is a structural schematic view of a backlight module according to another embodiment of the present application.

Further, when being gradually far away from the light emitting surfaces 112A of the photoelectric elements 112, the light brightness is gradually reduced. Therefore, correspondingly and optionally, cutting areas of the hollowed parts 151 are gradually reduced to gradually improve reflective areas, and the light is caused to enter the light guide surface 131 of the light guide plate 13 with a relatively uniform brightness. As shown in FIG. 1c, the patterns of the hollowed parts 151 may be selected to be trapezoid or approximately trapezoid, that is, when approaching to or connected to the light emitting surfaces of the photoelectric elements 121, the hollowed parts 151 may have larger cutting widths (the cutting widths D1 are still kept not greater than the widths D2 of the light emitting surfaces of the photoelectric elements). When being gradually far away from the light emitting surfaces 112A, the hollowed parts 151 are gradually narrowed and diminished to form the trapezoid or approximately trapezoid patterns.

According to the backlight module provided by the present embodiment, by forming the hollowed parts in the part of the reflective sheet corresponding to the light emitting surfaces of the photoelectric elements, the reflective brightness of the light emitting surfaces and the areas nearby is reduced, and the problem of uneven brightness is avoided.

Figure 2A:
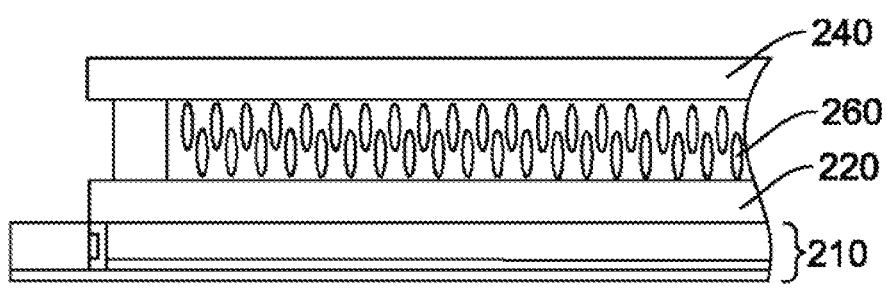
FIG. 2a is a structural schematic view of a display device according to another embodiment of the present application.
Figure 2B:
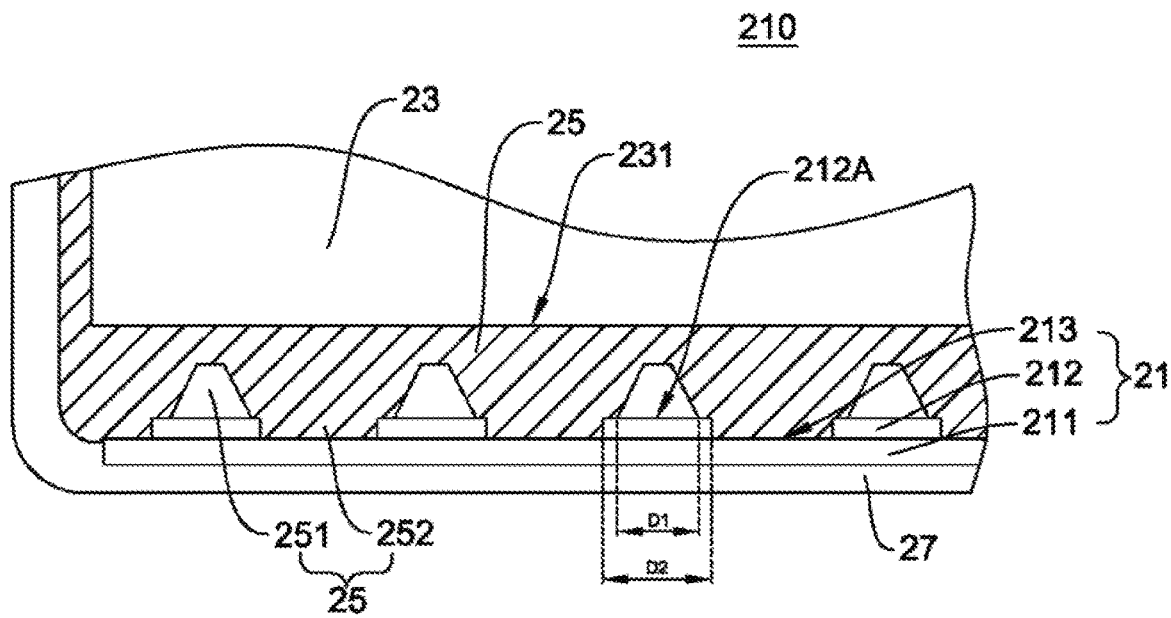

In the embodiment of the present application, as shown in FIG. 2a, there is provided a display device 200, including an array substrate 220 and a color light filter substrate 240 disposed oppositely, and a liquid crystal layer 260 disposed between the array substrate 220 and the color light filter substrate 240; and further including a backlight module 210, disposed on the bottom of the array substrate 220.

Wherein as shown in FIG. 2b, the backlight module 210 includes a back cover 27, and a light guide plate 23 and a reflective sheet 25 which are laminated on the back cover 27 up and down; and at least one light bar 21, disposed on the reflective sheet 25 and corresponding to a side part of the light guide plate 23.

Wherein the side part of the light guide plate 23 includes a light incident surface 231, used for receiving light emitted by the light bar 21.

The light bar 21 includes a circuit board 211 and a plurality of photoelectric elements 212, wherein the photoelectric elements 212 may be for example LED lights. The plurality of photoelectric elements 212 are sequentially arranged at intervals and are connected on the circuit board 211. The circuit board 211 includes spacing parts 213 located between two adjacent photoelectric elements 212. Light emitting surfaces 212A of the photoelectric elements 212 correspond to the light incident surface 231 of the light guide plate 23.

Further, the reflective sheet 25 of the present embodiment is disposed between the light guide plate 23 and the light bar 21. The reflective sheet 25 includes hollowed parts 251, and protruded parts 252 sandwiched between two adjacent hollowed parts 251.

Wherein the hollowed parts 251 are correspondingly disposed between the light emitting surfaces 212A and the light incident surface 231, to reduce the reflective brightness of the photoelectric elements 212. Optionally, the areas with the strongest brightness between the light emitting surfaces 212A and the light incident surface 231 are concentrated in the light emitting surface 212A of each photoelectric element 212 and the areas nearby, while the light-emitting angle of each photoelectric element 212 is about 110°-140°, such that optionally, the hollowed parts 251 further extend to a direction of the light bar 21 till corresponding to the lower sides of the photoelectric elements 212, and the hollowed parts 251 are caused to correspond to the light emitting surfaces 212A and the areas nearby, so as to achieve the purpose of reducing the reflective brightness of the photoelectric elements 212.

Further, in order to ensure or enhance the reflective brightness of other areas while the reflective brightness of the light emitting surfaces is reduced, for example, the brightness of emergent light on both sides of the photoelectric elements 212 is less than the central brightness of the photoelectric elements 212A. In order to ensure that the emergent light on both sides of the photoelectric elements 212 keeps sufficient reflective brightness, optionally, cutting widths D1 of the hollowed parts 251 are enabled to be not greater than widths D2 of the light emitting surfaces 212A of the photoelectric elements 212, as shown in FIG. 2b.

In addition, in order to further supplement or enhance the reflective brightness of other areas, the protruded parts 252 extend to a direction of the light bar 21 and are connected to the spacing parts 213, such that the light emergent from the both sides of the photoelectric elements 212 can also be incident to the light incident surface 231 after being reflected by the protruded parts 252 of the reflective sheet 25. In this way, the central brightness of the light emitting surfaces of the photoelectric elements 212 is reduced, and the reflective brightness of the peripheries of the photoelectric elements is further enhanced. Under the solution of "one reduction and one enhancement", it can be ensured that the light entering the light guide plate 13 is uniform in brightness and tends to be consistent, existence of a bright area or the dark area is avoided, and the quality of the backlight module is improved.

As mentioned above, there are many choices for patterns of the hollowed parts 251. For example, as shown in FIG. 2b, the hollowed parts 251 are gradually narrowed toward a direction of the light incident surface 231. When being gradually far away from the light emitting surfaces 212A of the photoelectric elements 212, the light brightness is gradually reduced. Therefore, correspondingly and optionally, cutting areas of the hollowed parts 251 are gradually reduced to gradually improve reflective areas, and the light is caused to enter the light guide surface 231 of the light guide plate with a relatively uniform brightness.

For example, the patterns of the hollowed parts 251 may be selected to be trapezoid, that is, when approaching to or connected to the light emitting surfaces of the photoelectric elements 221, the hollowed parts 251 may have larger cutting widths (the cutting widths D1 are still kept not greater than the widths D2 of the light emitting surfaces of the photoelectric elements). When being gradually far away from the light emitting surfaces 212A, the hollowed parts 251 are gradually narrowed and diminished to form the trapezoid patterns.

In order for the convenience in a manufacturing process, one side of the reflective sheet 25 corresponding to the light bar 21 may be cut to form the hollowed parts 251 and the protruded parts 252 according to specific patterns. The widths of the cut hollowed parts 251 and the distances between the hollowed parts 251 are determined according to actual light bar parameters, and one side of the cut reflective sheet 25 is sawtooth-shaped (may refer to FIG. 1b).

According to the display device of the present embodiment, in the backlight module, the shapes of the hollowed parts of the reflective sheet are further adjusted, such that the light emergent brightness is more uniform and consistent, it is ensured that the light guide plate obtains the incident light with a uniform brightness and the display quality of the display device is ensured.

Figure 3A:
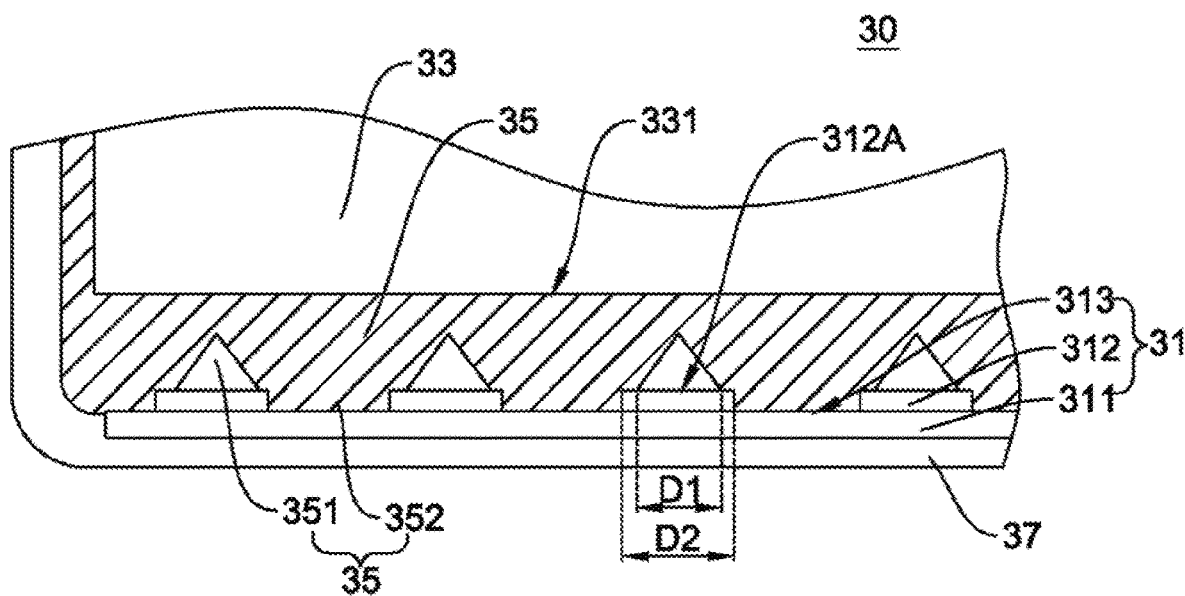
FIG. 3a is a structural schematic view of a backlight module according to yet another embodiment of the present application.

Another embodiment of the present application provides a backlight module, as shown in FIG. 3a, the backlight module 30 includes a back cover 37 and a light guide plate 33 and a reflective sheet 35 which are laminated on the back cover 37 up and down, such that the reflective sheet 35 is located between the light guide plate 33 and the back cover 37; and at least one light bar 31, disposed on the reflective sheet 35 and corresponding to a side part of the light guide plate 33.

Wherein the side part of the light guide plate 33 includes a light incident surface 331, used for receiving light emitted by the light bar 31.

The light bar 31 includes a circuit board 311 and a plurality of photoelectric elements 312, wherein the photoelectric elements 312 may be for example LED lights. The plurality of photoelectric elements 312 are sequentially arranged at intervals and are connected on the circuit board 311. Spacing parts 313 are disposed between two adjacent photoelectric elements 312. Light emitting surfaces 312A of the photoelectric elements 312 correspond to the light incident surface 331 of the light guide plate 33.

Further, the reflective sheet 35 of the present embodiment is disposed between the light guide plate 33 and the light bar 31. The reflective sheet 35 includes hollowed parts 351 corresponding to the light bar 31, and protruded parts 352 sandwiched between two adjacent hollowed parts 351.

In an exemplary art, the photoelectric elements in the light bar are arrayed in a relative dense manner, a light-emitting angle of each photoelectric element is about 110°-140°, and a light-emitting area is also correspondingly in an area corresponding to such included angle. The purpose of the dense arrangement of the photoelectric elements is to enable the light-emitting areas of two adjacent photoelectric elements to be coincided and then to enter the light incident surface of the light guide plate, such that relatively uniform incident light can be obtained. However, in actual product assembling, in consideration of the cost, it is hard to densely arrange the photoelectric elements on the light bar, as a result, the distance between the two photoelectric elements is increased, and it is in probability that the light-emitting areas of the two adjacent photoelectric elements are not coincided till entering the light incident surface. Since the brightness of the light-emitting areas of the photoelectric element is high, under the assistance of the reflective sheet, the brightness enters the light guide plate with almost no loss. Secondly, the brightness of non-light-emitting areas is low, and if there is no supplementation from other reflective ways, part of the light guide plate in the non-light-emitting areas presents an obvious dark area.

Therefore, in the present embodiment, the light incident brightness can be uniformized by structural improvement on the reflective sheet 35.

Wherein the hollowed parts 351 are correspondingly disposed between the light emitting surfaces 312A and the light incident surface 331, to reduce the reflective brightness of the photoelectric elements 312. Optionally, the areas with the strongest brightness between the light emitting surfaces 312A and the light incident surface 331 are concentrated in the light emitting surface 312A of each photoelectric element 312 and the areas nearby, while the light-emitting angle of each photoelectric element 312 is about 110°-140°, such that optionally, the hollowed parts 351 further extend to a direction of the light bar 31 till corresponding to the lower sides of the photoelectric elements 312, and the hollowed parts 351 are caused to correspond to the light emitting surfaces 312A and the areas nearby, so as to achieve the purpose of reducing the reflective brightness of the photoelectric elements 312.

Further, in order to ensure or enhance the reflective brightness of other areas while the reflective brightness of the light emitting surfaces is reduced, for example, the brightness of emergent light on both sides of the photoelectric elements 312 is less than the central brightness of the photoelectric elements 312A. In order to ensure that the emergent light on both sides of the photoelectric elements 312 keeps sufficient reflective brightness, optionally, cutting widths D1 of the hollowed parts 351 are enabled to be not greater than widths D2 of the light emitting surfaces 312A of the photoelectric elements 312, as shown in FIG. 3a.

In addition, in order to further supplement or enhance the reflective brightness of other areas, the protruded parts 352 extend to a direction of the light bar 31 and are connected to the spacing parts 313, such that the light emergent from the both sides of the photoelectric elements 312 can also be incident to the light incident surface 331 after being reflected by the protruded parts 352 of the reflective sheet 35. In this way, the central brightness of the light emitting surfaces of the photoelectric elements 312 is reduced, and the reflective brightness of the peripheries of the photoelectric elements 312 is further enhanced. Under the solution of "one reduction and one enhancement", it can be ensured that the light entering the light guide plate 33 is uniform in brightness, existence of a bright area or the dark area is avoided, and the quality of the backlight module is improved.

As mentioned above, when being gradually far away from the light emitting surfaces 312A of the photoelectric elements 312, the light brightness is gradually reduced. Therefore, correspondingly and optionally, cutting areas of the hollowed parts 351 are gradually reduced to gradually improve reflective areas, and the light is caused to enter the light guide surface 331 of the light guide plate 33 with a relatively uniform brightness. As shown in FIG. 3a, the patterns of the hollowed parts 351 may be selected to be triangle, that is, when approaching to or connected to the light emitting surfaces of the photoelectric elements 312, the hollowed parts 351 may have larger cutting widths (the cutting widths D1 are still kept not greater than the widths D2 of the light emitting surfaces of the photoelectric elements). When being gradually far away from the light emitting surfaces 312A, the hollowed parts 351 are gradually narrowed and diminished to form the triangle patterns.

Figure 3B:
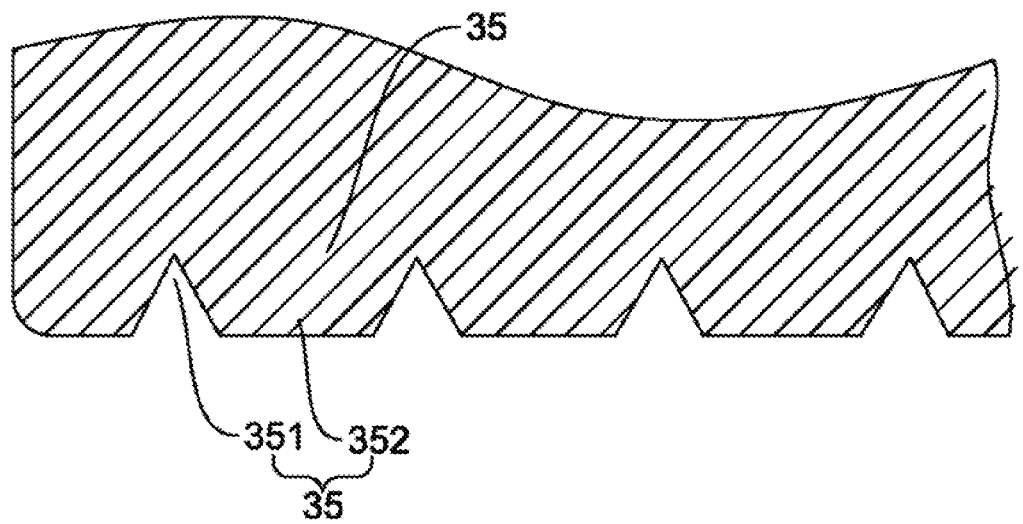
FIG. 3b is a structural schematic view of a reflective sheet in a backlight module according to an embodiment of the present application.

In order for the convenience in a manufacturing process, one side of the reflective sheet 35 corresponding to the light bar 31 may be cut to form the hollowed parts 351 and the protruded parts 352 according to specific patterns. The widths of the cut hollowed parts 351 and the distances between the hollowed parts 351 are determined according to actual light bar parameters, and one side of the cut reflective sheet 35 is sawtooth-shaped, in combination with FIG. 3b.

Further, according to the backlight module provided by the present embodiment, by forming the hollowed parts in the part of the reflective sheet corresponding to the light emitting surfaces of the photoelectric elements, the reflective brightness of the light emitting surfaces and the areas nearby is reduced, and the problem of uneven brightness is avoided.

Figure 4A:
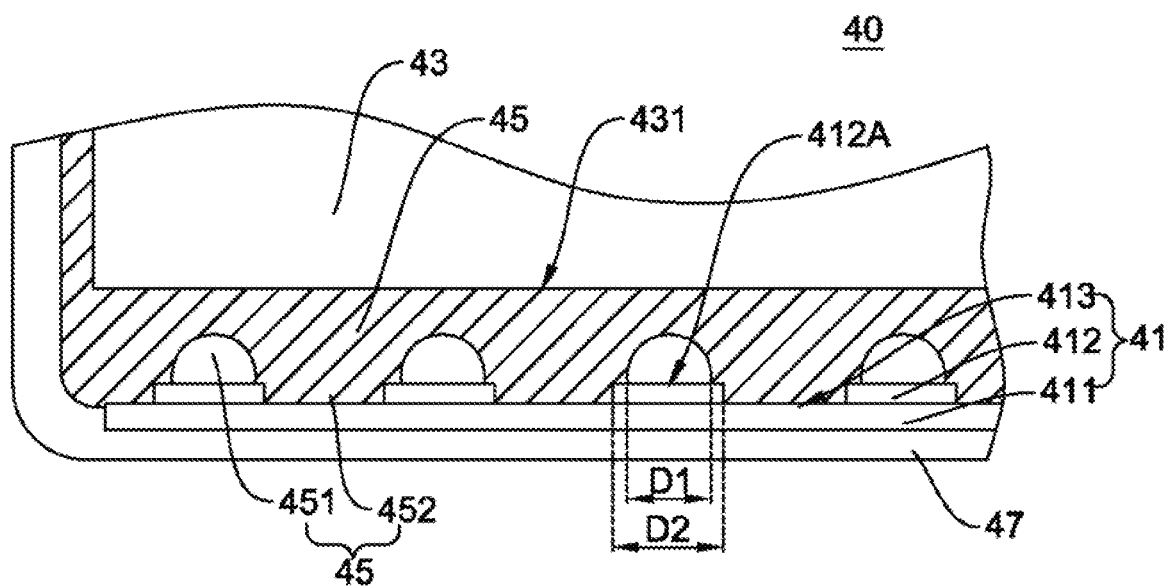
FIG. 4a is a structural schematic view of a backlight module according to still a further embodiment of the present application.

Yet another embodiment of the present application provides a backlight module, as shown in FIG. 4a, the backlight module 40 includes a back cover 47 and a light guide plate 43 and a reflective sheet 45 which are laminated on the back cover 47 up and down, such that the reflective sheet 45 is located between the light guide plate 43 and the back cover 47; and at least one light bar 41, disposed on the reflective sheet 45 and corresponding to a side part of the light guide plate 43.

Wherein the side part of the light guide plate 43 includes a light incident surface 431, used for receiving light emitted by the light bar 41.

The light bar 41 includes a circuit board 411 and a plurality of photoelectric elements 412, wherein the photoelectric elements 412 may be for example LED lights. The plurality of photoelectric elements 412 are sequentially arranged at intervals and are connected on the circuit board 411. Spacing parts 413 are disposed between two adjacent photoelectric elements 412. Light emitting surfaces 412A of the photoelectric elements 412 correspond to the light incident surface 431 of the light guide plate 43.

Further, the reflective sheet 45 of the present embodiment is disposed between the light guide plate 43 and the light bar 41. The reflective sheet 45 includes hollowed parts 451 corresponding to the light bar 41, and protruded parts 452 sandwiched between two adjacent hollowed parts 451.

In an exemplary art, the photoelectric elements in the light bar are arrayed in a relative dense manner, a light-emitting angle of each photoelectric element is about 110°-410°, and a light-emitting area is also correspondingly in an area corresponding to such included angle. The purpose of the dense arrangement of the photoelectric elements is to enable the light-emitting areas of two adjacent photoelectric elements to be coincided and then to enter the light incident surface of the light guide plate, such that relatively uniform incident light can be obtained. However, in actual product assembling, in consideration of the cost, it is hard to densely arrange the photoelectric elements on the light bar, as a result, the distance between the two photoelectric elements is increased, and it is in all probability that the light-emitting areas of the two adjacent photoelectric elements are not coincided till entering the light incident surface. Since the brightness of the light-emitting areas of the photoelectric element is high, under the assistance of the reflective sheet, the brightness enters the light guide plate with almost no loss. Secondly, the brightness of non-light-emitting areas is low, and if there is no supplementation from other reflective ways, part of the light guide plate in the non-light-emitting areas presents an obvious dark area.

Therefore, in the present embodiment, the light incident brightness can be uniformized by structural improvement on the reflective sheet 45.

Wherein the hollowed parts 451 are correspondingly disposed between the light emitting surfaces 412A and the light incident surface 431, to reduce the reflective brightness of the photoelectric elements 412. Optionally, the areas with the strongest brightness between the light emitting surfaces 412A and the light incident surface 431 are concentrated in the light emitting surface 412A of each photoelectric element 412 and the areas nearby, while the light-emitting angle of each photoelectric element 412 is about 110°-140°, such that optionally, the hollowed parts 451 further extend to a direction of the light bar 41 till corresponding to the lower sides of the photoelectric elements 412, and the hollowed parts 451 are caused to correspond to the light emitting surfaces 412A and the areas nearby, so as to achieve the purpose of reducing the reflective brightness of the photoelectric elements 412.

Further, in order to ensure or enhance the reflective brightness of other areas while the reflective brightness of the light emitting surfaces is reduced, for example, the brightness of emergent light on both sides of the photoelectric elements 412 is less than the central brightness of the photoelectric elements 412A. In order to ensure that the emergent light on both sides of the photoelectric elements 412 keeps sufficient reflective brightness, optionally, cutting widths D1 of the hollowed parts 451 are enabled to be not greater than widths D2 of the light emitting surfaces 412A of the photoelectric elements 412, as shown in FIG. 4a.

In addition, in order to further supplement or enhance the reflective brightness of other areas, the protruded parts 452 extend to a direction of the light bar 41 and are connected to the spacing parts 413, such that the light emergent from the both sides of the photoelectric elements 412 can also be incident to the light incident surface 431 after being reflected by the protruded parts 452 of the reflective sheet 45. In this way, the central brightness of the light emitting surfaces of the photoelectric elements 412 is reduced, and the reflective brightness of the peripheries of the photoelectric elements 412 is further enhanced. Under the solution of "one reduction and one enhancement", it can be ensured that the light entering the light guide plate 43 is uniform in brightness, existence of a bright area or the dark area is avoided, and the quality of the backlight module is improved.

Figure 4B:
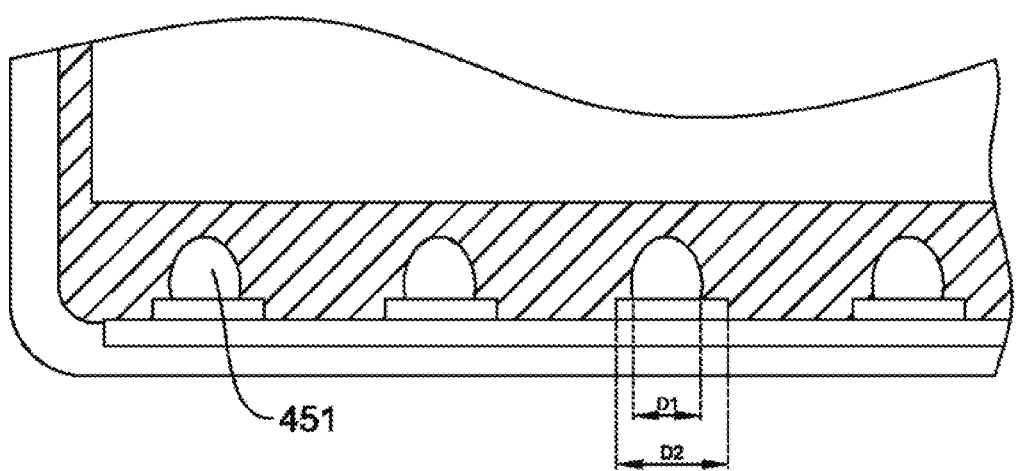
FIG. 4b is a structural schematic view of a backlight module according to one additional embodiment of the present application.

As mentioned above, when being gradually far away from the light emitting surfaces 412A of the photoelectric elements 412, the light brightness is gradually reduced. Therefore, correspondingly and optionally, cutting areas of the hollowed parts 451 are gradually reduced to gradually improve reflective areas, and the light is caused to enter the light guide surface 431 of the light guide plate 43 with a relatively uniform brightness. As shown in FIGS. 4a and 4b, the patterns of the hollowed parts 451 may be selected to be semispherical or semioval, that is, when approaching to or connected to the light emitting surfaces of the photoelectric elements 424, the hollowed parts 451 may have larger cutting widths (the cutting widths D1 are still kept not greater than the widths D2 of the light emitting surfaces of the photoelectric elements). When being gradually far away from the light emitting surfaces 412A, the hollowed parts 451 are gradually narrowed and diminished to form the semispherical patterns.

In order for the convenience in a manufacturing process, one side of the reflective sheet 45 corresponding to the light bar 41 may be cut to form the hollowed parts 451 and the protruded parts 454 according to specific patterns. The widths of the cut hollowed parts 451 and the distances between the hollowed parts 451 are determined according to actual light bar parameters, and one side of the cut reflective sheet 45 is sawtooth-shaped.

Further, according to the backlight module provided by the present embodiment, by forming the hollowed parts in the part of the reflective sheet corresponding to the light emitting surfaces of the photoelectric elements, the reflective brightness of the light emitting surfaces and the areas nearby is reduced, and the problem of uneven brightness is avoided.

What is claimed is:

1. A backlight module, comprising
a light guide plate, comprising a light incident surface in a side part thereof;
a light bar, comprising a circuit board and a plurality of photoelectric elements disposed on the circuit board, wherein the circuit board comprises spacing parts located between two adjacent photoelectric elements, and light emitting surfaces of the photoelectric elements correspond to the light incident surface;
a reflective sheet, disposed between the light guide plate and the light bar, wherein the reflective sheet comprises hollowed parts, and the hollowed parts are correspondingly disposed between the light emitting surfaces and the light incident surface; the hollowed parts and the plurality of photoelectric elements are respectively formed on one side of the reflective sheet adjacent to the light bar correspondingly at intervals, the reflective sheet further comprises protruded parts formed between two adjacent hollowed parts, and the protruded parts extend to a direction of the light bar, such that one side of the reflective sheet adjacent to the light bar is sawtooth-shaped; and
a back cover, wherein the back cover is disposed on the bottom of the reflective sheet, such that the reflective sheet is located between the back cover and the light guide plate;
wherein the protruded parts are connected to the spacing parts of the circuit board, such that light emergent from both sides of the photoelectric elements is incident to the light incident surface after being reflected by the protruded parts of the reflective sheet.

2. A backlight module, comprising
a light guide plate, comprising a light incident surface in a side part thereof;
a light bar, comprising a circuit board and a plurality of photoelectric elements disposed on the circuit board, wherein the circuit board comprises spacing parts located between two adjacent photoelectric elements, and light emitting surfaces of the photoelectric elements correspond to the light incident surface; and
a reflective sheet, disposed between the light guide plate and the light bar, wherein the reflective sheet comprises hollowed parts, and the hollowed parts are correspondingly disposed between the light emitting surfaces and the light incident surface;
wherein the reflective sheet further comprises protruded parts formed between two adjacent hollowed parts; the protruded parts extend towards the light bar and are in contact with the spacing parts of the circuit board, such that light emergent from both sides of the photoelectric elements is incident to the light incident surface after being reflected by the protruded parts of the reflective sheet.

3. The backlight module according to claim 2, wherein the hollowed parts and the plurality of photoelectric elements are respectively formed on one side of the reflective sheet adjacent to the light bar correspondingly at intervals, one side of the reflective sheet adjacent to the light bar is sawtooth-shaped.

4. The backlight module according to claim 3, wherein the hollowed parts extend to be below the photoelectric elements.

5. The backlight module according to claim 4, wherein cutting widths of the hollowed parts are not greater than widths of the light emitting surfaces of the photoelectric elements.

6. The backlight module according to claim 5, wherein patterns of the hollowed parts are rectangular.

7. The backlight module according to claim 5, wherein the hollowed parts are gradually narrowed toward a direction of the light incident surface.

8. The backlight module according to claim 7, wherein the patterns of the hollowed parts are trapezoid or triangular or semicircular or semioval.

9. The backlight module according to claim 8, further comprising a back cover, wherein the back cover is disposed on the bottom of the reflective sheet, such that the reflective sheet is located between the back cover and the light guide plate.

10. The backlight module according to claim 2, wherein the hollowed parts extend to be below the photoelectric elements.

11. The backlight module according to claim 10, wherein cutting widths of the hollowed parts are not greater than widths of the light emitting surfaces of the photoelectric elements.

12. The backlight module according to claim 2, further comprising a back cover, wherein the back cover is disposed on the bottom of the reflective sheet, such that the reflective sheet is located between the back cover and the light guide plate.

13. A display device, comprising an array substrate and a color light filter substrate disposed oppositely, and a liquid crystal layer disposed between the array substrate and the color light filter substrate; wherein the display device further comprises a backlight module, correspondingly disposed on the bottom of the array substrate, wherein
the backlight module comprises
a light guide plate, comprising a light incident surface in a side part thereof;
a light bar, comprising a circuit board and a plurality of photoelectric elements disposed on the circuit board, wherein the circuit board comprises spacing parts located between two adjacent photoelectric elements, and light emitting surfaces of the photoelectric elements correspond to the light incident surface; and
a reflective sheet, disposed between the light guide plate and the light bar, wherein the reflective sheet comprises hollowed parts, and the hollowed parts are correspondingly disposed between the light emitting surfaces and the light incident surface;
wherein the reflective sheet further comprises protruded parts formed between two adjacent hollowed parts, the protruded parts extend towards the light bar and are connected to the spacing parts of the circuit board such that light emergent from both sides of the photoelectric elements is incident to the light incident surface after being reflected by the protruded parts of the reflective sheet, and one side of the reflective sheet adjacent to the light bar is sawtooth-shaped.

14. The display device according to claim 13, wherein the hollowed parts and the plurality of photoelectric elements are formed on one side of the reflective sheet adjacent to the light bar correspondingly at intervals.

15. The display device according to claim 13, wherein the hollowed parts extend to be below the photoelectric elements.

16. The display device according to claim 15, wherein cutting widths of the hollowed parts are not greater than widths of the light emitting surfaces of the photoelectric elements.

17. The display device according to claim 16, wherein patterns of the hollowed parts are rectangular.

18. The display device according to claim 16, wherein the hollowed parts are gradually narrowed toward a direction of the light incident surface.

19. The display device according to claim 18, wherein the patterns of the hollowed parts are trapezoid or triangular or semicircular or semioval.

20. The display device according to claim 13, further comprising a back cover, wherein the back cover is disposed on the bottom of the reflective sheet, such that the reflective sheet is located between the back cover and the light guide plate.

* * * * *